Oct. 29, 1940.  W. B. CLIFFORD  2,219,542

THERMOSTATIC DEVICE

Filed Aug. 11, 1937

Witness
Paul F. Bryant

Inventor
Walter B. Clifford
by his Attorneys
Fish Hildreth Cary & Jenney

Patented Oct. 29, 1940

2,219,542

UNITED STATES PATENT OFFICE 2,219,542

THERMOSTATIC DEVICE

Walter B. Clifford, Boston, Mass., assignor to Clifford Manufacturing Co., Boston, Mass., a corporation of Delaware Application August 11, 1937, Serial No. 158,530

2 Claims. (Cl. 236—34)

The present invention relates to cooling systems for vehicle motors, and is more particularly concerned with thermostatic devices for controlling the operation of such systems.

Motor vehicle cooling systems are generally provided with a thermostatic control which prevents circulation by cooling fluid through the radiator until the temperature of cooling fluid around the motor has risen to a predetermined range. This may be accomplished either by a thermostatic device located in the cooling line, generally between the motor and radiator, which shuts off circulation until the temperature about the motor block rises to the predetermined range, or a similar device which by-passes cooling fluid around the block until this range is attained.

It is the object of the present invention to avoid certain disadvantages inherent in these cooling systems as at present manufactured and installed, and with this object in view it is proposed to provide a cooling system having a thermostatic control by virtue of which cooling fluid flow through the radiator is prevented until sufficient rise in temperature has been attained. Thereafter flow continues so long as the motor operates and fluid pressure is maintained in the cooling line. Diminishing of this pressure due to stoppage of the motor together with the pump closes the cooling circuit and prevents continued circulation by thermo-siphon action through the radiator. This closed condition of the circuit prevails regardless of the temperature of the motor block until operation of the motor is resumed. It will be evident that with this mode of operation dissipation of heat from the motor block through the radiator is prevented except during operation of the motor.

In the simplest and most efficient form of the invention which has yet been devised, closing of the cooling circuit is accomplished upon motor stoppage through the use of a gravity valve which normally closes the port in the thermostatic unit except during motor operation, when the pressure behind the valve is sufficient to maintain it in open position after opening of the temperature valve and so long as the temperature valve remains open and the motor continues to operate with a consequent pressure in the cooling system.

Figure 1:
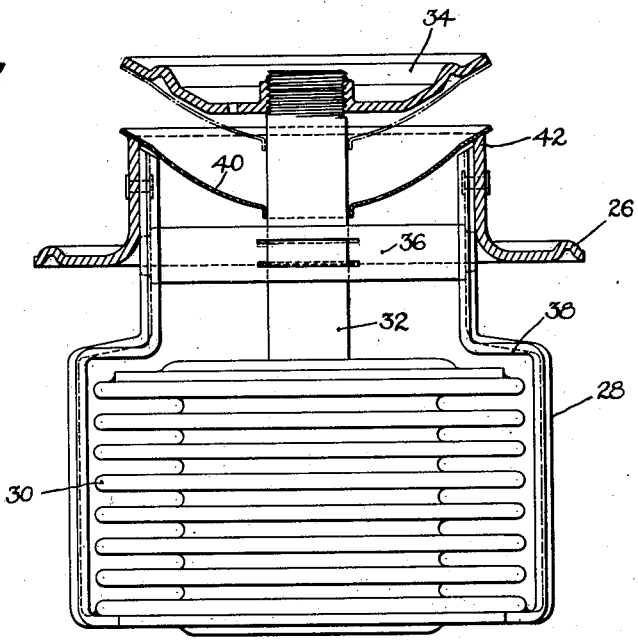
Figure 2:
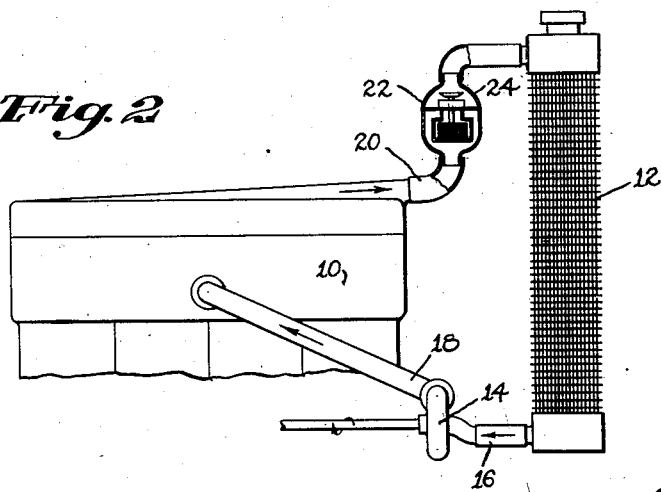

In the accompanying drawing, Fig. 1 illustrates a section in elevation of a conventional thermostatic control modified in accordance with the present invention; and Fig. 2 represents a complete cooling system with the thermostatic control embodied therein.

Referring particularly to the illustrated embodiment of the invention, the motor block is indicated at 10, the radiator at 12, the circulating pump at 14, with connections 16 and 18 leading from the radiator to the pump and from the pump to the motor, respectively. Fluid is conducted from the upper portion of the block to the radiator by a connection 20 in which is inserted a thermostatic control device 22 designed to open and permit circulation when the temperature of the fluid about the motor block is at a predetermined and elevated range, but to remain closed when the temperature of fluid about the block is below this range.

The thermostatic unit is enclosed in an outer casing 24, and as indicated in Fig. 1, is provided with a flange 26 designed to be clamped within the casing in the usual manner. The device comprises essentially a generally U-shaped strap support 28 within which is mounted a bellows unit 30, having a stem 32 supporting a valve 34 at its upper end. The stem is guided in a transverse guide member 36 connected to the upper portion of the support, and expanding movement of the bellows 30 is limited by engagement with the re-entrant shoulders 38. All of the foregoing construction is common to this type of device, and the present illustration merely represents a conventional form of structure used for this purpose.

According to the present invention a gravity operated valve 40 is slidable loosely upon the stem 32. This valve normally rests upon the valve seat 42, and when the main valve 34 is closed due to contraction of the thermostat, the valve 40 is engaged thereby and held tightly against the seat. When the motor is started and cooling fluid in the block heats up, the main valve is opened by expansion of the bellows upon attainment of the predetermined temperature range for which the device is set. As the main valve opens, the pressure head of the cooling fluid beneath the gravity valve 40 holds it against the main valve and elevates the two valves together. So long as forced circulation of fluid continues through operation of the motor and the pump 14, the main valve remains open and the gravity valve is retained in the position shown in dot and dash lines in Fig. 1. At any time, however, when the motor is stopped with a consequent stoppage of the pump and reduction of pressure head due thereto, the gravity valve drops upon its seat, blocking the line against thermo-siphon circulation through the radiator. The gravity valve will remain in this position regardless of temperature until the motor is again started. If for any reason whatsoever this closing of flow causes the generation of steam in the motor block due to residual heat after a hard operation, the pressure generated, if any, will lift the gravity valve and permit relief.

Obviously the weight of the gravity valve may be varied in order to meet conditions as encountered due to each particular system, but fundamentally the valve is intended to remain open due to the pressure head in the cooling system resulting from operation of the motor, and to drop and close against any head which may be normally present when the motor has ceased operation.

It will be evident that with this construction continued circulation of cooling fluid through the radiator after stopping of the motor is prevented, and dissipation of heat from the motor block is accordingly diminished.

What is claimed is:

1. A thermostatic unit for the cooling system of internal combustion motors comprising a supporting base having a valve port, a valve operating in conjunction with the port, a thermostatic device connected with the valve and serving to open and close the valve in accordance with temperature changes, and a gravity operated valve interposed between the first valve and port and normally closing the port except when elevated by the pressure of cooling liquid behind it.

2. A thermostatic unit for the cooling system of internal combustion motors comprising a support having a valve port, a valve, a stem upon which the valve is mounted, a thermostatic device for moving the valve toward and from the port, a pressure operated valve supported on the stem and supplementing the action of the first-mentioned valve to close the port when the pressure behind the valve drops below a predetermined range.

WALTER B. CLIFFORD.